US006561225B2

(12) United States Patent
Raftis

(10) Patent No.: US 6,561,225 B2
(45) Date of Patent: May 13, 2003

(54) PASSIVE FLOW CONTROL VALVE

(75) Inventor: Spiros G. Raftis, Mt. Lebanon, PA (US)

(73) Assignee: Red Valve Co., Inc., Carnegie, PA (US)

( * ) Notice: Subject to any disclaimer, the term of this patent is extended or adjusted under 35 U.S.C. 154(b) by 0 days.

(21) Appl. No.: 10/038,535

(22) Filed: Jan. 2, 2002

(65) Prior Publication Data

US 2002/0104573 A1 Aug. 8, 2002

Related U.S. Application Data

(60) Provisional application No. 60/259,596, filed on Jan. 3, 2001.

(51) Int. Cl.[7] ................................................. F15D 1/02
(52) U.S. Cl. ........................................ 138/41; 138/37
(58) Field of Search ............................. 138/37, 39, 41, 138/44

(56) References Cited

U.S. PATENT DOCUMENTS

| 3,572,391 | A | * | 3/1971 | Hirsch | 138/40 |
| 4,786,185 | A | * | 11/1988 | Knief | 366/340 |
| 6,186,179 | B1 | * | 2/2001 | Hill | 138/39 |

* cited by examiner

Primary Examiner—Patrick Brinson
(74) Attorney, Agent, or Firm—Webb Ziesenheim Logsdon Orkin & Hanson, P.C.

(57) ABSTRACT

A passive flow control valve including a barrier member positioned in a fluid conduit between an upstream conduit portion and a downstream conduit portion. The barrier member substantially prevents fluid flow around a barrier member perimeter. The passive flow control valve also includes barrier member orifices extending through the barrier member, which allow controlled fluid flow through the barrier member orifices. When the fluid flows through the upstream conduit portion and encounters the barrier member, the fluid is prevented from passing around the barrier member perimeter and is forced to flow through the barrier member orifices.

20 Claims, 4 Drawing Sheets

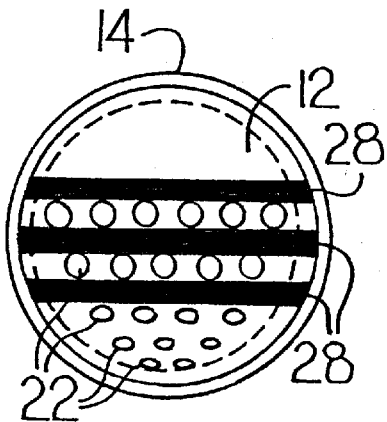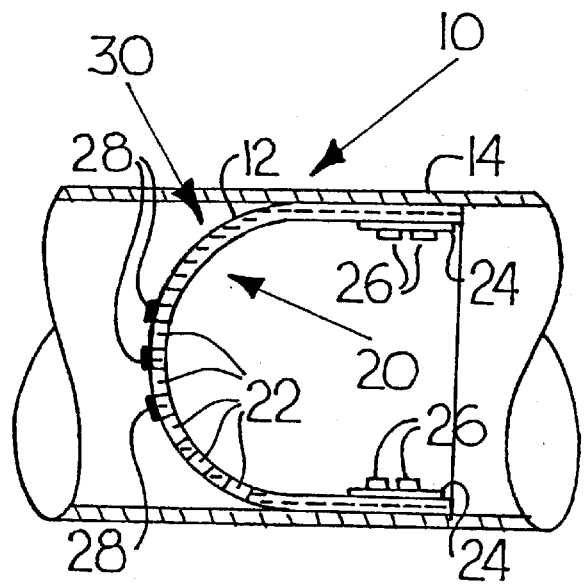
Fig. 2a  Fig. 2b
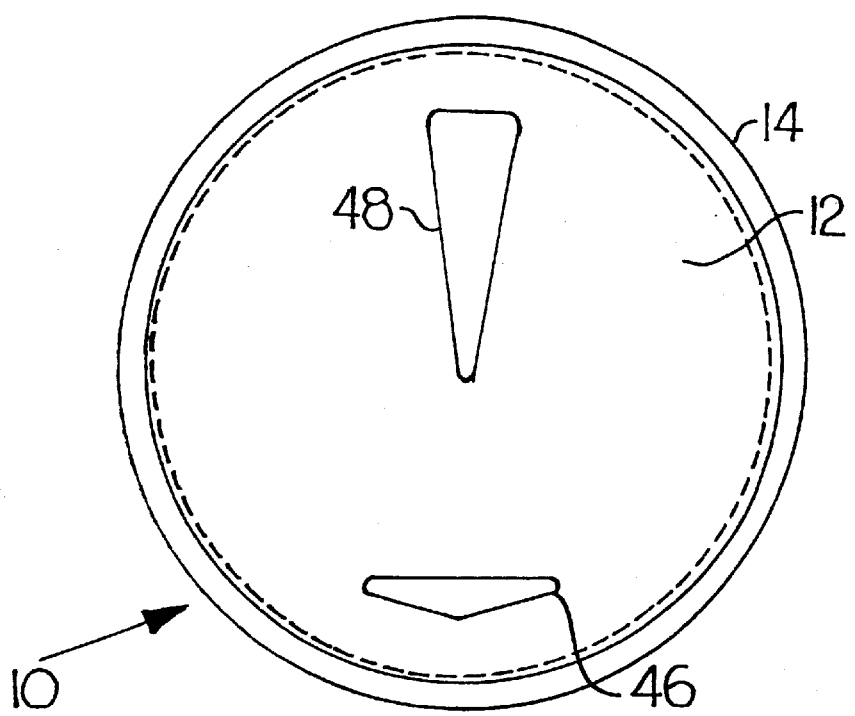
Fig. 5

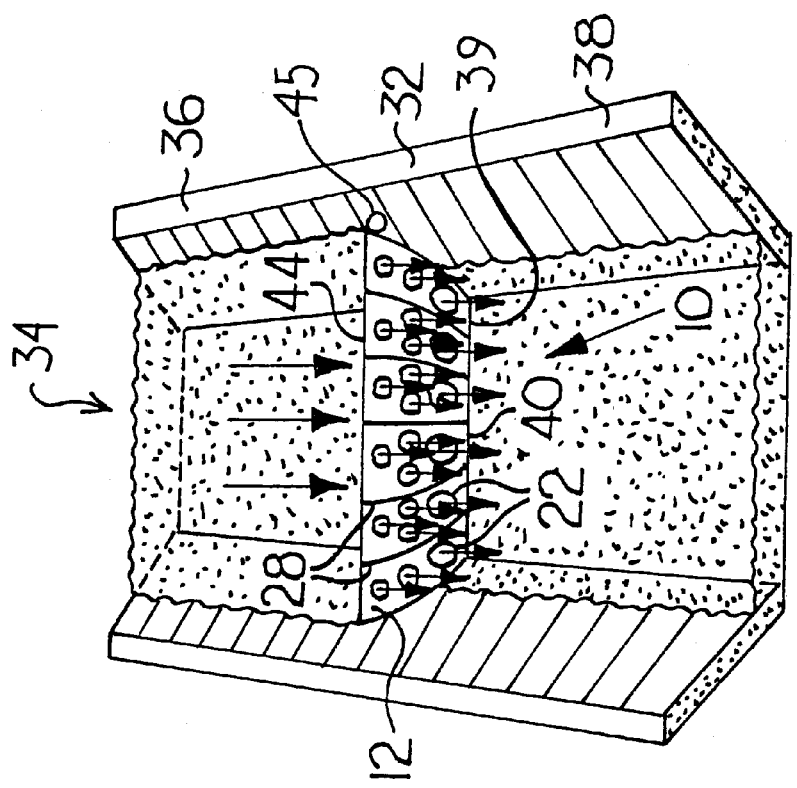
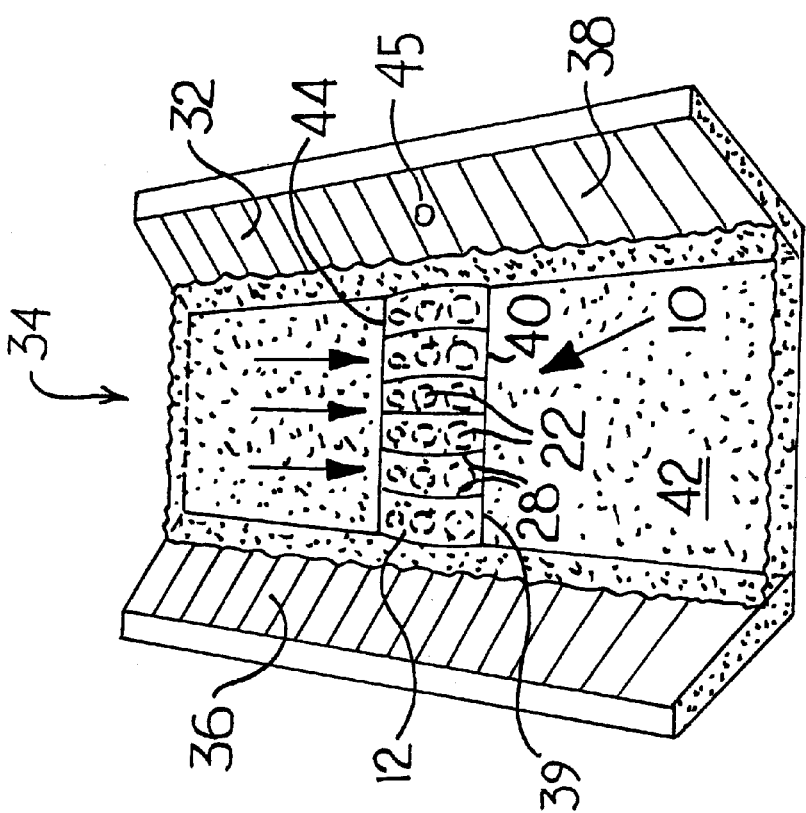
Fig. 4b
Fig. 4a

PASSIVE FLOW CONTROL VALVE

CROSS REFERENCE TO RELATED APPLICATIONS

This application claims the benefit of U.S. Provisional Application Serial No. 60/259,596, filed Jan. 3, 2001, which is hereby incorporated by reference in its entirety.

BACKGROUND OF THE INVENTION

1. Field of the Invention

The present invention relates generally to flow control valves, and in particular, to flow control valves used to control stormwater, irrigation water or the like.

2. Description of Related Art

In many municipalities, heavy downpours of rain often result in street flooding and sewage treatment plant overload. The sewage treatment plants could be overloaded or flooded by short duration, heavy rainfall. During this rainfall, valves or gates must be closed, either partially or fully, to limit the flow of water into the processing plant. The flow restriction "backs up" the water in the upstream piping or drainage ditch. When the heavy rainfall subsides, this stored water is released under controlled conditions, by adjusting the valves or gates to achieve the desired, restricted flow. However, conventional methods of controlling stormwater influent typically use valves or gates that require an external energy source to operate. For example, these valves or gates may be manual, electric, pneumatic or hydraulic.

It is therefore an object of the present invention to provide passive control of high flow fluids, such as stormwater runoff, requiring no outside operating assistance. It is another object of the present invention to provide automatic flow control that does not utilize any external energy source to open or close the controller. It is yet another object of the present invention to provide a flow control valve that holds back a surge of an initial heavy downpour of rain, resulting in excessive stormwater during a storm, yet still allows drainage of either a drainage ditch or a stormwater line at a reduced rate. It is a further object of the present invention to automatically provide reduced flow after a storm without any external energy source required to operate the device.

SUMMARY OF THE INVENTION

The present invention is a passive flow control valve having a barrier member, which is positioned between and separates an upstream fluid flow and a downstream fluid flow. At least during high flow conditions, this barrier member prevents any substantial fluid flow around a barrier member perimeter, controlling the flow of fluid. In addition, the present invention includes at least one barrier orifice in the barrier member. The barrier orifice is configured to allow controlled fluid flow through the barrier member during normal fluid flow states, as well as during drastically increased fluid flow states.

The present invention could be used as an in-line addition to a stormwater pipeline, or alternatively, across a stormwater drainage ditch. Further, the present invention may be utilized to control fluid flow in an irrigation ditch.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 2a is a front view of a second embodiment according to the present invention;

FIG. 2b is a side sectional view of the second embodiment in FIG. 2a;

FIG. 4a is a perspective view of a fourth embodiment according to the present invention during a low flow period;

FIG. 4b is a perspective view of the fourth embodiment in FIG. 4a during an increased flow period; and FIG. 5 is a front view of a fifth embodiment according to the present invention.

DETAILED DESCRIPTION OF THE PREFERRED EMBODIMENTS

Figure 1A:
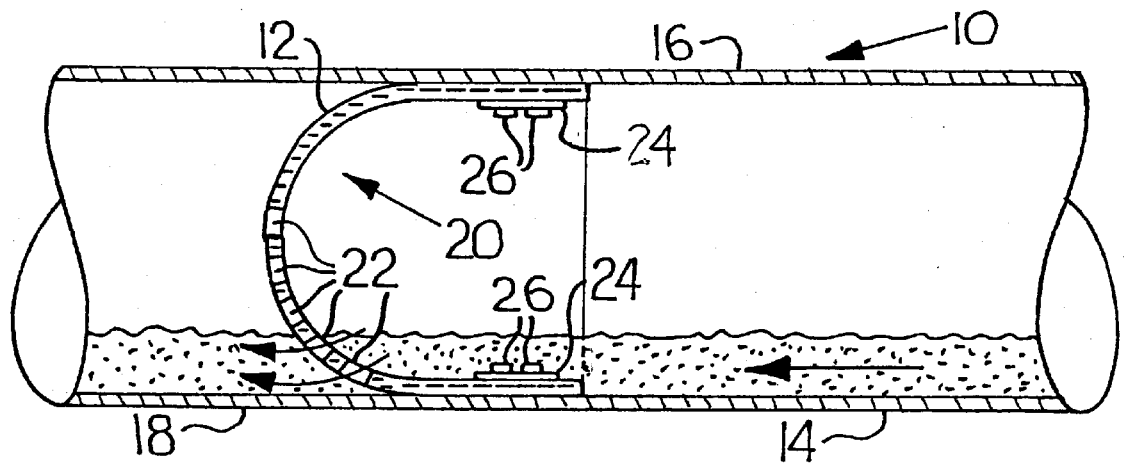
FIG. 1a is a side sectional view of a first embodiment according to the present invention during a low flow period.
Figure 1B:
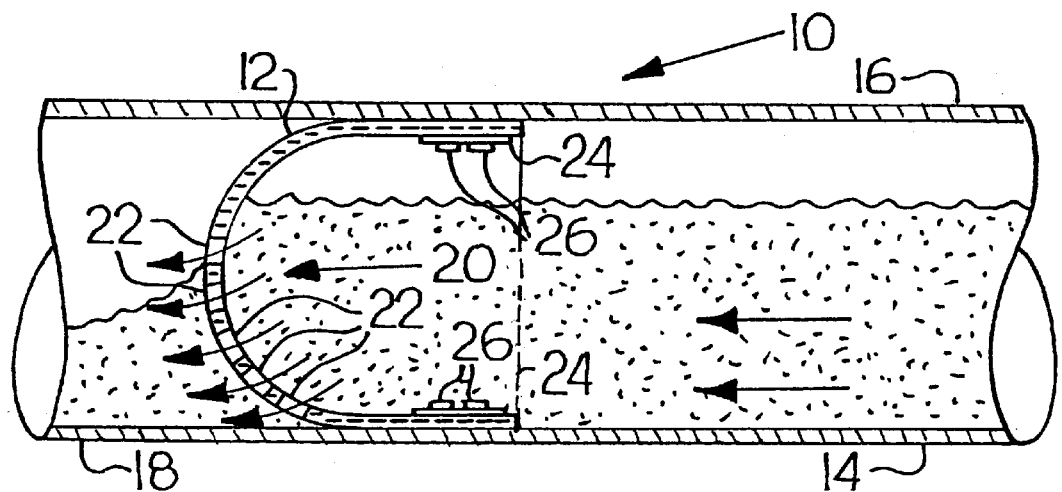
FIG. 1b is a side sectional view of the first embodiment in FIG. 1a during an increased flow period.
Figure 1C:
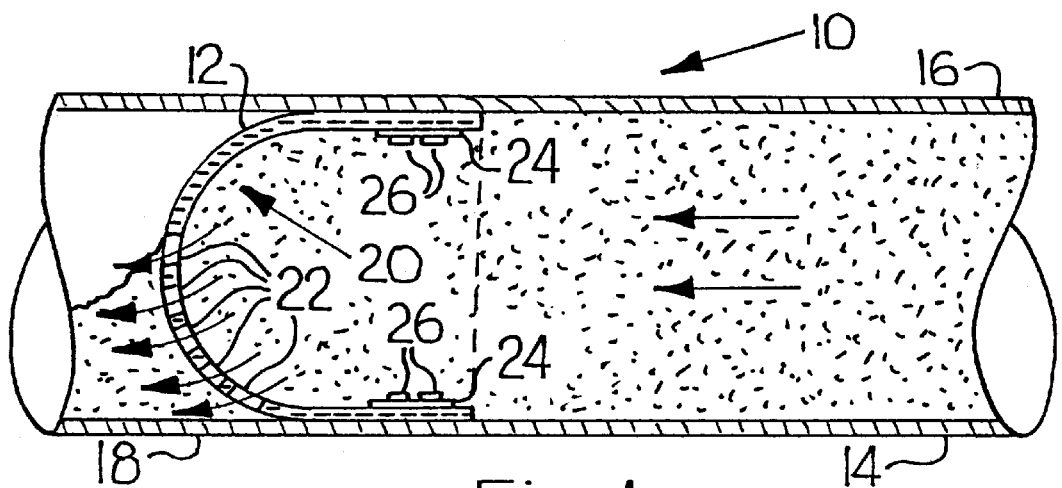
FIG. 1c is a side sectional view of the first embodiment in FIG. 1a during a maximum flow period.

A first embodiment of the flow control valve 10 of the present invention is generally shown in FIGS. 1a–1c. This first embodiment of the flow control valve 10 is particularly adapted to be used in an in-line application in a pipeline, for example, a stormwater drainage pipeline. The flow control valve 10 includes a barrier member 12 positioned inside a pipeline 14, essentially separating the pipeline 14 into upstream pipeline 16 and downstream pipeline 18. Fluid, for example stormwater or irrigation water, flows through the upstream pipeline 16, where it eventually encounters the barrier member 12. In this preferred embodiment, the barrier member 12 is thimble-shaped, and the upstream fluid flow through the upstream pipeline 16 enters a concave portion 20 of the barrier member 12. The present invention 10 also includes at least one, and preferably more than one, barrier orifice 22. These barrier orifices 22 allow controlled fluid flow through the barrier member 12. In this embodiment, the barrier orifices 22 are positioned substantially on a bottom half of the barrier member 12. When fluid flows into the concave portion 20 of the barrier member 12, the fluid then flows through the barrier orifices 22 into the downstream pipeline 18.

As seen in FIG. 1a, during a low flow period, fluid passes from the upstream pipeline 16 through the barrier member 12 via the barrier orifices 22, and into the downstream pipeline 18 with little or no interruption in fluid flow. However, as shown in FIG. 1b, during sudden, increased flow conditions, the barrier member 12 essentially stops high volume, instantaneous fluid flow, allowing only limited and controlled flow through the barrier orifices 22. Thus, for example, a sudden surge of stormwater through the pipeline would not adversely impact a stormwater treatment plant located downstream of the flow control valve 10, since the large volume of fluid is limited and controlled during its flow through the barrier orifices 22.

FIG. 1c illustrates operation of the flow control valve 10 during a maximum flow period. Even during this maximum flow period, the flow control valve 10 limits and controls fluid flow to the same level as the increased fluid flow of FIG. 1b. The upstream pipeline 16 becomes a storage area for fluid, slowly releasing fluid through the barrier orifices 22.

The barrier member 12 may be secured to the pipeline 14 with an expandable metal band 24. This expandable metal band 24 can be secured directly to the walls of the pipeline 14 with, for example, a bolt arrangement 26. It is preferable to secure the barrier member 12 at its base to ensure rigidity.

It will be apparent to those skilled in the art that the barrier orifices 22, can be sized smaller or larger, as required, for the desired drainage rate and to prevent blockage by solid objects which may be present in the fluid flow. It is further envisioned that the number of barrier orifices 22 can be varied according to the fluid flow needs of a particular application. In addition, these barrier orifices 22 can be round or any other suitable shape.

In a second embodiment of the present invention, shown in FIGS. 2a–2b, ribs 28 may be provided on the barrier member 12, specifically on the outer, convex portion 30 of the barrier member 12. These ribs 28 may be attached to or integrally formed with the barrier member 12. In this embodiment, the ribs 28 run substantially across the convex portion 30 of the barrier member 12, providing overall support to the barrier member 12. These ribs 28 may be made with support rubber having a high durometer (approximately 90 Shore A) and reinforcing ply fabric, with at least one ply and, in many cases, multiple plies. These ribs 28 assist the barrier member 12 in holding the weight of the tremendous volume of fluid in the upstream pipeline 16. It is also envisioned that external metal ribs can be used to provide such support. Another view of these ribs 28 is illustrated in FIG. 2b.

Figure 3A:
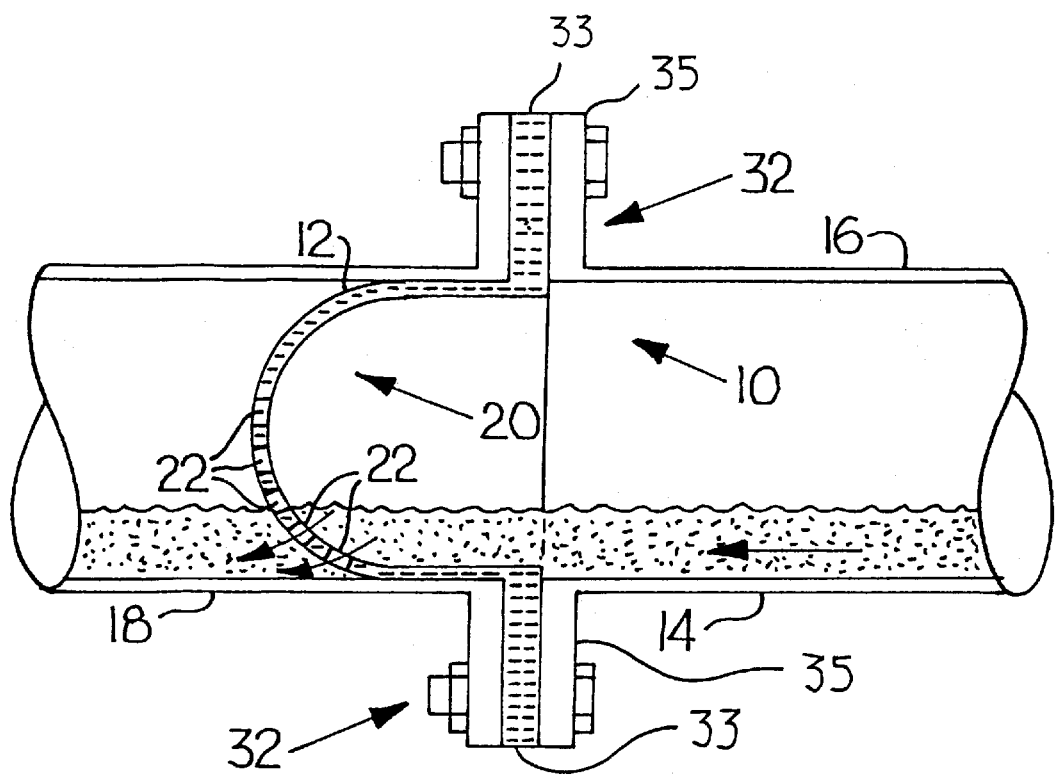
FIG. 3a is a side sectional view of a third embodiment according to the present invention during a low flow period.
Figure 3B:
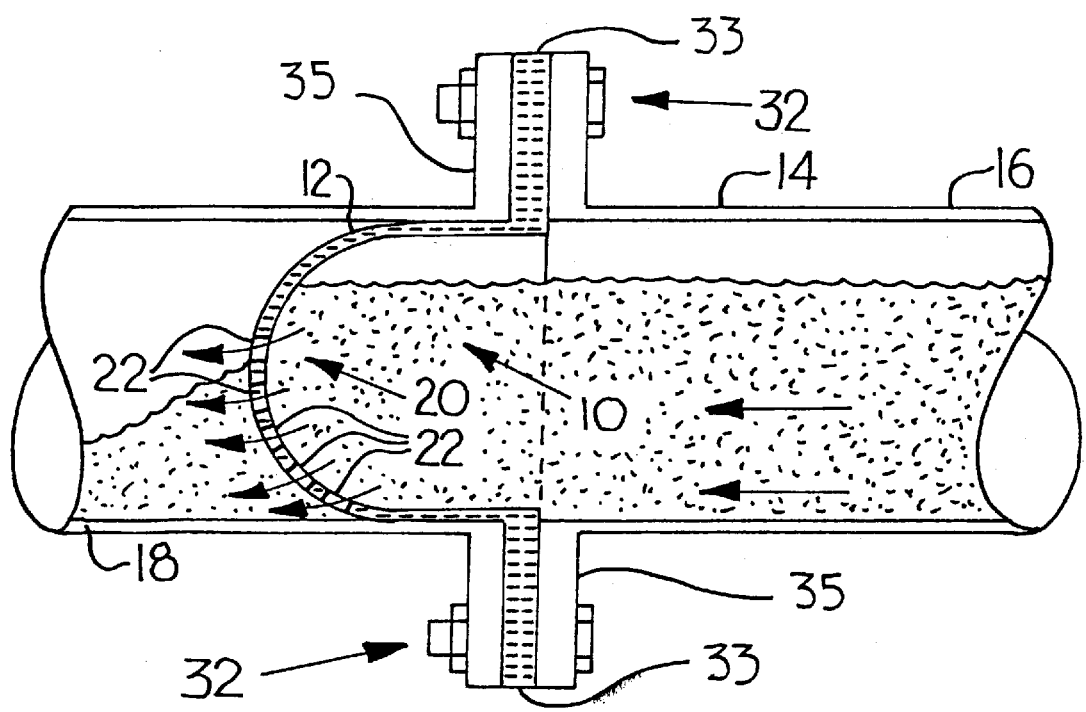
FIG. 3b is a side sectional view of the third embodiment in FIG. 3a during an increased flow period.

In a third embodiment of the present invention, shown in FIGS. 3a–3b, the expandable metal band 24 is replaced with flange arrangement 32. In this embodiment, the barrier member 12 includes an attachment portion 33 extending around the edge of the barrier member 12. The attachment portion 33 is configured to be attached or clamped between a pipeline flange 35. As shown in FIG. 3a, using this flange arrangement 32 to secure the barrier member 12 to the pipeline 14 provides better overall securement. In addition, this third embodiment of the present invention may be easier to install and maintain because it is external to the pipeline 14. The overall flow characteristics of this embodiment are unchanged from those of the first and second embodiments of the present invention.

The fourth embodiment of the present invention is illustrated in FIGS. 4a and 4b. This embodiment is particularly adapted to control stormwater or irrigation through an open drainage ditch 34. As with the pipeline 14, the open drainage ditch 34 has an upstream ditch 36 and a downstream ditch 38. Fluid flows through this open drainage ditch 34, through the upstream ditch 36 and encounters the barrier member 12. Similar to the previous embodiments, in the fourth embodiment of the present invention, the barrier member 12 is sized such that, in operation, the barrier member prevents any substantial fluid flow around the barrier member perimeter. There may be a very low leakage rate around the perimeter due to the uneven surface of the open drainage ditch 34 walls. In this embodiment the barrier member 12 has multiple barrier orifices 22, which allow controlled fluid to flow through the barrier member 12 into the downstream ditch 38.

It is preferable that the barrier orifices 22 are larger near a bottom portion of the barrier member 12, and smaller near an upper portion of the barrier member 12. This type of arrangement allows for greater restriction in flow during increased flow situations. Also, it is preferable for the barrier member 12 to utilize ribs 28 to support the barrier member 12 against this greater volume, and therefore weight, of water.

In this embodiment, the barrier member 12 is attached along a barrier member base 40 to bottom wall 42 of the open drainage ditch 34 by a hinge 39. It is important that the attachment of the barrier member base 40 to the bottom wall 42 of the open drainage ditch 34 be a hinged connection. It is also preferable that the barrier member 12 be a slightly concave shape, as with the first embodiment of the present invention. It is the concave portion 20 which is first contacted by fluid flow from the upstream ditch 36.

As seen in FIG. 4a, during low flow situations, the barrier member 12 lies backwards, with a barrier member top edge 44 touching the bottom wall 42 of the open drainage ditch 34. At this point, the fluid or stormwater flows over the barrier member top edge 44 (which is positioned at 0°, with respect to the ditch bottom wall 42), continues over and through the barrier member 12 and barrier orifices 22, and passes over the barrier member base 40 continuing through the downstream ditch 38. As the water level and flow begin to increase, the barrier member 12 begins to rise and restrict the flow, as shown in FIG. 4b. Due to the hinge 39, connecting the barrier member base 40 and the bottom wall 42 of the open drainage ditch 34, the barrier member 12 pivots upward and forward and stops at a predetermined position, forcing the fluid to flow through the barrier orifices 22. As flow increases, the barrier member 12 continues to move forward until it is in a position that is almost perpendicular to the bottom wall 42 of the open drainage ditch 34. A positive stop element 45 (on one or both walls of the ditch 34) may also be used to prevent the barrier member 12 from moving beyond a certain raised position.

As discussed previously, using larger barrier orifices 22 near the barrier member base 40, allows greater fluid flow during low flow situations, and permits passage of solids through the barrier member 12, but restricts fluid flow during high flow situations. The height of the barrier member 12 is selected to control to a desired flow. When the fluid flow returns to normal flow rates, the barrier member 12 (by gravity) slowly begins to move back to its original position, with the barrier member top edge 44 eventually again flush against the bottom wall 42 of the open drainage ditch 34.

A fifth embodiment of the present invention is illustrated in FIG. 5. As with the first embodiment, the fifth embodiment of the present invention is directed specifically to in-line pipeline applications. A cross-sectional view of the fifth embodiment would resemble FIGS. 1a–3b, described above. However, it is envisioned that this arrangement can be adapted to open drainage ditch applications as well. In this fifth embodiment, the barrier member 12 has two barrier orifices. A first barrier orifice 46 is positioned and sized such that it permits flow of debris through this first barrier orifice 46. For example, the first barrier orifice 46 is sized to prevent blocking by objects such as tree branches or other foreign material, and may have an inverted triangular shape.

A second barrier orifice 48 is located near the barrier member top side 44. This second barrier orifice 48 also has an inverted triangular shape, which permits a higher flow rate as the level of fluid behind the barrier member 12 rises. In addition, this second barrier orifice 48 is also a flow rate controller. Specifically, this flow rate may be controlled by varying the shape and dimensions of this second barrier orifice 48. It is envisioned that other configurations of barrier orifices can be implemented to handle specific flow conditions and rates of flow.

Overall, the flow control valve 10 of the present invention is a completely passive control system which requires no outside assistance to operate. There is no need for an operator to go out in the height of a storm to operate the present invention 10. Further, the flow control valve 10 automatically provides reduced flow after a storm, and returns to normal flow during normal flow conditions. It is important to note that, while the present invention has been described only as to stormwater and irrigation applications, the present invention is also applicable and useful in other pipeline or drainage ditch applications that require passive flow control.

This invention has been described with reference to the preferred embodiments. Obvious modifications and alterations will occur to others upon reading and understanding the preceding detailed description. It is intended that the invention be construed as including all such modifications and alterations.

I claim:

1. A passive flow control valve, comprising:
   a barrier member the second side having a convex shape and positioned in a fluid conduit between an upstream conduit portion and a downstream conduit portion and configured to substantially prevent fluid flow around a barrier member perimeter; and
   at least one barrier member orifice extending through the barrier member and configured to allow substantially controlled fluid flow through the barrier member orifice;
   wherein, at least during elevated flow conditions, when fluid flow through the upstream conduit portion encounters the barrier member, the fluid is prevented from passing around the barrier member perimeter and forced to flow through the at least one barrier member orifice wherein at least a portion of the barrier member is secured to a conduit wall; wherein the barrier member is substantially thimble-shaped and a barrier member edge is secured to the conduit wall by an expandable metal band.

2. The passive flow control valve of claim 1, wherein the barrier member orifice extends through a bottom half of the barrier member.

3. The passive flow control valve of claim 1, wherein the expandable metal band secures the barrier member to the conduit wall by a bolt arrangement.

4. The passive flow control valve of claim 1, wherein the barrier member further comprises an attachment portion configured to be secured between pipeline flanges.

5. The passive flow control valve of claim 1, wherein the at least one barrier orifice is circular.

6. The passive flow control valve of claim 1, further comprising two barrier orifices, a first barrier orifice extending through a bottom portion of the barrier member, and a second barrier orifice extending through a top portion of the barrier member.

7. The passive flow control valve of claim 6, wherein the first and second barrier orifices are an inverted substantially triangular shape.

8. A passive flow control valve, comprising:
   a barrier member having at least one reinforcing rib and positioned in a fluid conduit between an upstream conduit portion and a downstream conduit portion and configured to substantially prevent fluid flow around a barrier member perimeter; and
   at least one barrier member orifice extending through the barrier member and configured to allow substantially controlled fluid flow through the barrier member orifice;
   wherein, at least during elevated flow conditions, when fluid flow through the upstream conduit portion encounters the barrier member, the fluid is prevented from passing around the barrier member perimeter and forced to flow through the at least one barrier member orifice.

9. The passive flow control valve of claim 8, wherein the reinforcing rib is positioned on a downstream side of the barrier member and extends substantially across the width of the barrier member.

10. The passive flow control valve of claim 8, wherein the reinforcing rib is manufactured from one of rubber, a reinforced ply fabric and metal.

11. The passive flow control valve of claim 10, wherein the reinforcing ply fabric comprises multiple plies.

12. The passive flow control valve of claim 8, wherein the reinforcing rib is integrally formed with the barrier member.

13. A passive flow control valve, comprising:
   a barrier member positioned in a fluid conduit between an upstream conduit portion and a downstream conduit portion and configured to substantially prevent fluid flow around a barrier member perimeter; and
   at least one barrier member orifice extending through the barrier member and configured to allow substantially controlled fluid flow through the barrier member orifice;
   wherein, at least during elevated flow conditions, when fluid flow through the upstream conduit portion encounters the barrier member, the fluid is prevented from passing around the barrier member perimeter and forced to flow through the at least one barrier member orifice, and
   wherein the barrier member is configured to extend across a ditch having two sidewalls and a bottom wall, the barrier member pivotably attached at a barrier member base to the ditch bottom wall.

14. The passive flow control valve of claim 13, wherein the barrier member has a first side and a second side, the first side having a concave shape, and the second side having a convex shape.

15. The passive flow control valve of claim 13, wherein the barrier member is movable between a first lowered position, with respect to the ditch bottom wall, and a second elevated position, with respect to the ditch bottom wall.

16. The passive flow control valve of claim 15, further comprising a positive stop element configured to prevent the barrier member from pivoting past a predetermined maximum elevated position.

17. The passive flow control valve of claim 16, further comprising a plurality of barrier orifices having a circular shape and extending through the barrier member, a first portion of the plurality of barrier orifices positioned substantially on a bottom portion of the barrier member and having a larger diameter than a second portion of the plurality of barrier orifices positioned substantially on a top portion of the barrier member.

18. The passive flow control valve of claim 1, wherein the conduit is one of a pipeline, a drainage ditch and an irrigation ditch.

19. A method of passively controlling fluid flow through a conduit having two sidewalls and a bottom wall, comprising the steps of:
   pivotably attaching a base of a barrier member having at least one barrier orifice extending therethrough to the bottom wall of the conduit;

directing fluid from an upstream portion of the conduit through the at least one barrier member orifice and over the barrier member to a downstream portion of the conduit;

increasing the flow of fluid from the upstream portion of the conduit, thereby causing the barrier member to pivot from a first lowered position, with respect to the conduit bottom wall, to a second elevated position, with respect to the conduit bottom wall; and directing the increased flow of fluid through the at least one barrier orifice to the downstream portion of the conduit in a controlled manner.

20. The passive flow control valve of claim 1, wherein the barrier member has a first side and a second side, the first side having a concave shape, and a second side having a convex shape.

* * * * *